United States Patent Office 3,398,151
Patented Aug. 20, 1968

3,398,151
AZASPIRODECANEDIONES AND
AZASPIROUNDECANEDIONES
Yao Hua Wu, Evansville, Ind., assignor to Mead Johnson & Company, Evansville, Ind., a corporation of Indiana
No Drawing. Continuation-in-part of application Ser. No. 523,945, Feb. 1, 1966. This application Jan. 9, 1967, Ser. No. 607,908
11 Claims. (Cl. 260—268)

ABSTRACT OF THE DISCLOSURE 8-(4-phenyl - 1 - piperazinylalkylene)-8-azaspiro[4,5] decane-7,9-diones having up to three substituents in the phenyl ring have been synthesized from the corresponding 4-phenylpiperazines and 3,3-tetramethyleneglutaric anhydride. Substitution of 3,3-pentamethyleneglutonic anhydride in the method yields the corresponding 3-azaspiro[5,5]undecane-2,4-dione derivatives. These substances have strong activity and good selectivity in suppressing conditioned avoidance response in animals and other potent pharmacologic effects. The phenyl substituents are alkoxy, alkyl, alkylthio, halogen, $CF_3$, $NH_2$, alkanoamido, and alkylsulfonamido. Alkylene is from 2 to 6 carbon atoms and may contain —O— or —C≡C—.

---

This patent application is a continuation-in-part of my copending patent application Ser. No. 523,945, filed Feb. 1, 1966 now abandoned.

This invention involves a group of novel substances having the following structural formula and the acid addition salts thereof.

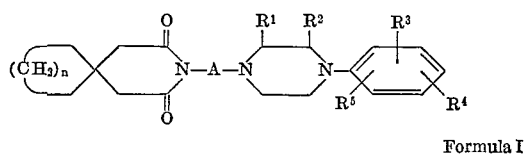

Formula I

In the foregoing structural formula, n- is the integer 4- or 5-. The symbol —A— refers to a divalent open chain group which links the nitrogen atom of the azaspiro ring to the nitrogen atom of the piperazine ring through at least two carbon atoms. It may be an alkylene group, an oxalkylene group, or 1,4-but-2-ynylene.

The alkylene group contains from 2 to 6 carbon atoms in a straight or branched chain and is constructed of an alkane having two valences available for bonding to the nitrogen atoms as shown. The bonding may take place through two adjacent carbon atoms or through two more widely separated carbon atoms of the chain. Examples of alkylene groups are —$CH_2CH_2$—,

—CH$_2$CH—
     |
     CH$_3$

—$CH_2CH_2CH_2$—, —$(CH_2)_6$—.

The oxalkylene group is similarly related to a dialkyl ether. That is, the oxalkylene group is an alkylene group containing an ether oxygen atom in the chain. The oxalkylene group contains 4 to 6 carbon atoms and is so constituted that neither of the carbon atoms involved in the ether-linkage serves as connection to the azaspiro nitrogen atom or the piperazine nitrogen atom; that is neither nitrogen-connecting carbon atom of the oxalkylene chain is linked to the oxygen atom thereof. A special instance of an —A— connecting group is the 1,4-but-2-ynylene group, —$CH_2C≡CCH_2$—.

$R^1$ and $R^2$ of Formula I are hydrogen atoms or methyl groups, the former being preferred. $R^3$, $R^4$, and $R^5$ are the same or different and are selected from hydrogen, lower alkoxy of up to 4 carbon atoms, lower alkyl of up to 4 carbon atoms, lower alkylthio of up to 4 carbon atoms, halogen, trifluoromethyl, nitro, amino, or alkanoamido or alkylsulfonamido each of up to 6 carbon atoms.

To assist in naming the present compounds, partial structures corresponding to the azaspirodecanedione and azaspiroundecanedione portions of Formula I are shown below with the positions numbered.

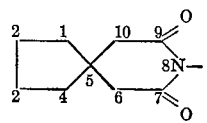  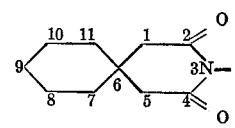

8-azaspiro [4, 5] decane-
7, 9-dione
Formula I, n=4

3-azaspiro [5 5] undecane-
2, 4-dione
Formula I, n=5

The compounds of Formula I are psychotropic agents, analgetics, centrally acting muscle relaxants, capillary protectants, anti-allergic agents, and anti-inflammatory agents, and anti-emetics. They may be administered orally, parenterally, or rectally in doses ranging from about 0.1 to 40 mg./kg. of body weight. For this purpose they may be formulated as tablets or capsules containing from about 2.5 to 200 mg. thereof, as injectable ampoules containing from 1.0 to 100 mg./ml. of compound in solution or suspension, or as suppositories containing from 2.5 to 500 mg. of one of the present substances.

For pharmaceutical purposes the compounds themselves may be employed as the free bases or as pharmaceutically acceptable acid addition salts. By pharmaceutically acceptable acid addition salt is meant a salt of one of the present bases in which the anionic portion is pharmaceutically compatible. For example the anion should not contribute appreciably to the toxicity of the resulting salt nor should it have chemical properties inconsistent with the chemical properties of the base resulting in an inherent instability. Suitable anions include chloride, bromide, iodide, phosphate, sulfate, nitrate, citrate, succinate, acetate, propionate, butyrate, tosylate, mesylate, lauryl sulfate, tannate, pamoate, and others known to the art as satisfactory for use with basic drugs.

CHEMICAL SYNTHESIS

Two general methods are available for the preparation of the present compounds. They are pictured below in the reaction schemes labelled Method A and Method B. These methods are adapted to variation by those skilled in the art to produce other compounds embraced by this invention, but not specifically disclosed. Variations thereof to produce the same compounds in somewhat different fashion will also be evident. Specific methods for the synthesis of certain individual types are also available. Such will be apparent to those skilled in the art. Certain of these are exemplified herein.

Method A

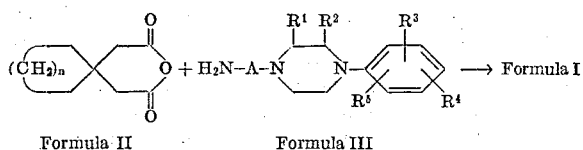

Formula II          Formula III

Method B

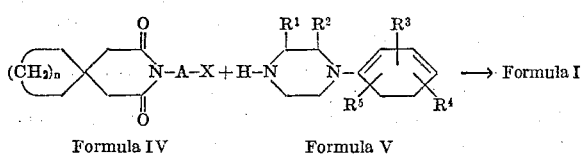

Formula IV          Formula V

In the foregoing reaction schemes, the symbols $n$, —A—, $R^1$, $R^2$, $R^3$, $R^4$, and $R^5$ have the same meaning as previously assigned relative to Formula I, excluding amino. The symbol X refers to a reactive ester group such as a chloride, bromide, iodide, sulfate, phosphate, tosylate, or mesylate.

According to Method A, the spiro-substituted glutaric anhydride of Formula II is allowed to react with the 1-(ω-aminoalkyl)-4-arylpiperazine of Formula III, resulting in formation of the product of Formula I. The glutaric anhydrides of Formula II and many arylpiperazines of Formula V are described in the literature or are commercially available. Synthesis of the piperazines of Formula III from those of Formula V have been described by S. Hayao and R. N. Sheet in J. Org. Chem. 26, 3415 (1961). Their method may be adapted for the preparation of other examples which may be required for the preparation of other compounds of the present invention which are not specifically disclosed.

The reaction is preferably carried out at elevated temperature in a reaction inert organic solvent. Temperatures of the order of 100 to 200° C. are preferred. Pyridine is the preferred solvent. A reaction period of at least about 2 hrs. is sufficient, although longer reaction times as may be convenient are customarily employed in the interest of obtaining maximum yield. A reflux period of 15 hrs. duration has been found to be quite satisfactory. Yields for the process of Method A are frequently in the range of 80 to 90%.

Occasionally the corresponding glutaric acid half-amide is obtained as a by-product of Method A. The half-amides have the structure shown in Formula VI. They are readily transformed into the products of Formula I by heating in boiling acetic anhydride.

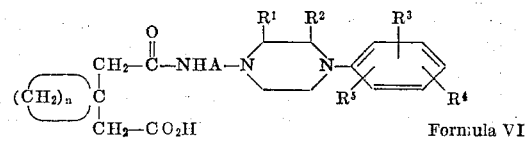

Formula VI

Whether the reaction has taken the desired course with the formation of the substance of Formula I, or whether substantial amounts of the by-product of Formula VI have been formed is determined prior to commencing purification procdures by examination of the infrared absorption spectrum. The products of Formula I are imides and their spectra typically contain absorption at 1700 and 1710 cm.$^{-1}$. The presence of amide-acid absorption typical of the Formula VI by-products at 1680, 1760, 3300 cm.$^{-1}$ indicates that further processing as described is required.

Method B is carried out under reaction conditions suitable for the preparation of tertiary amines by reaction of secondary amines with an alkyl halide, sulfate, phosphate, tosylate, or mesylate. The reactants are heated in an inert liquid reaction medium at temperatures of about 60° C. to about 150° C. in the presence of an acid binding agent. Benzene or n-butyl alcohol are the preferred reaction media. The preferred acid binding agent is sodium carbonate, but other inorganic and tertiary organic bases may be employed including other alkali and alkaline earth metal carbonates, bicarbonates, or hydrides and the tertiary amines.

The intermediate azasiprodecane- and undecanediones of Formula IV having the —A—X group attached to the nitrogen atom are prepared by reaction of the glutaric anhydrides of Formula II with an alkanolamine of the formula $H_2N$—A—OH under conditions similar to Method A. The resulting intermediate product has the formula shown for Formula IV with X as hydroxyl. This material is then esterified according to conventional techniques to provide the intermediate of Formula IV. For instance, thionyl chloride acting upon an alcohol precursor of Formula IV (X≡OH) produces the intermediate in which X is chlorine. Similarly the bromides, iodides, phosphates, sulfates, tosylates, and mesylates corresponding to Formula IV are prepared by conventional techniques.

The acid addition salts of the substances of the present invention are prepared by reaction of the compounds in the free base form with the desired acid. It is generally convenient to conduct the neutralization in an inert organic solvent as reaction medium employing carefully measured proportions of the acid and base. Since there are two basic nitrogen atoms, the two piperazino nitrogen atoms, in these products, mono- or di-salts may be prepared. Which of these products is obtained from a given neutralization is controllable by employing a predetermined quantity of the desired acid. For instance, reaction of one of the bases of the present invention with a monobasic acid in equimolar amounts yields a mono-salt while reaction with two molecular proportions of the acid yields a di-salt. When $R^3$, $R^4$, or $R^5$ is amino, additional possibilities for salt formation exist.

The following examples will serve to illustrate the foregoing description with respect to the preparation of various specific compounds.

METHOD A

Procedure 1.—A mixture of 0.1 mole of the substiuted glutaric anhydride (Formula II), 0.1 mole of 1-(ω-aminoalkyl)-4-phenylpiperazine (Formula III), and 400 ml. of pyridine is refluxed for 15 hrs. The solvent is removed by distillation and the infrared absorption spectrum of the residue is measured. In those cases where the spectrum exhibits typical imide bands at 1700 and 1710 cm.$^{-1}$, the residue is purified by either vacuum distillation or recrystallization from a suitable solvent to obtain the purified product as the free base. If the spectrum contains amide and carboxyl absorption bands at 1680, 1760, 3300 cm.$^{-1}$, the residue is refluxed with 10 parts by weight of acetic anhydride for 15 hrs. The acetic anhydride is removed by distillation and the residue is purified as above.

The hydrochloride salts are prepared by treating the ethanol solution of the free base with an equivalent amount of ethanolic hydrogen chloride solution.

The details of the experimental procedures as applied to a number of specific compounds are summarized in Table I.

TABLE I.—PRODUCTS PREPARED BY METHOD A

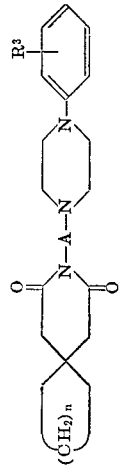

| Example No. | Formula | | | Base | | Hydrochloride | | | Analysis | | | |
|---|---|---|---|---|---|---|---|---|---|---|---|---|
| | n | A | R³ | B.P., °C./mm. Hg | Percent yield | M.P., °C. | Solvent | Formula | C | H | N | Cl |
| 1 | 4 | (CH₂)₂ | H | 215-235/0.45 | 80 | 135-137 (dec.) | 2-propanol | C₂₀H₂₇N₃O₂·HCl | 64.33 | 7.71 | 10.90 | |
| 2 | 4 | (CH₂)₃ | H | 250-252/0.5 | 80 | 234.5-236.5 (dec.) | 2-propanol ethanol, 1:1 | C₂₂H₃₁N₃O₂·HCl | 64.78 | 7.88 | 10.34 | 8.73 |
| 3 | 4 | (CH₂)₄ | H | 260-275/0.1 | 82.8 | 218.5-220.5 (dec.) | 2-propanol | C₂₃H₃₃N₃O₂·2HCl | 60.22 | 7.93 | 9.14 | 15.21 |
| 4 | 4 | (CH₂)₅ | H | 253-263/0.2 | 89 | 188.5-196.5 | Ethanol | C₂₁H₃₂N₃O₂·2HCl | 61.62 | 8.08 | 8.71 | |
| 5 | 4 | (CH₂)₃ | o-OCH₃ | 263-270/0.15-0.25 | 77.8 | 254-255 (dec.) | do | C₂₃H₃₃N₃O₃·HCl | 65.54 | 8.04 | 9.83 | 8.38 |
| 6 | 5 | (CH₂)₃ | o-OCH₃ | 230-260/0.2 | 92 | 211-212 (dec.) | do | C₂₃H₃₃N₃O₃·HCl | 63.46 | 7.11 | 9.68 | 8.28 |
| 7 | 4 | (CH₂)₂ | o-OCH₃ | 220-240/0.35 | 77 | 196.5-198.5 (dec.) | do | C₂₂H₃₁N₃O₃·2HCl | 57.56 | 7.62 | 9.03 | 15.10 |
| 8 | 4 | (CH₂)₃ | o-OCH₃ | 220-250/0.11 | 81 | 208.5-210.5 (dec.) | 2-propanol | C₂₃H₃₃N₃O₃·HCl | 58.61 | 7.75 | 10.21 | 8.69 |
| 9 | 4 | (CH₂)₂ | o-Cl | 225-235/0.3 | 94 | 205.5-207 | Isopropyl alcohol | C₂₁H₂₈ClN₃O₂·HCl | 65.06 | 7.28 | 9.65 | 8.05 |
| 10 | 4 | (CH₂)₃ | m-OCH₃ | 215-245/0.1 | 70 | 234.5-235.5 (dec.) | do | C₂₃H₃₃N₃O₃·HCl | 60.25 | 8.07 | 9.68 | 8.62 |
| 11 | 4 | (CH₂)₃ | m-OCH₃ | 220-260/0.1 | 80 | 235.5-237 | Ethanol | C₂₃H₃₃N₃O₃·2HCl | 63.05 | 8.13 | 8.70 | 15.18 |
| 12 | 4 | CH₂CH₂CH(CH₃)CH₂ | H | 235-250/0.25 | 89.6 | 207.5-212 | Isopropyl alcohol | C₂₄H₃₅N₃O₂·2HCl | 59.21 | 7.53 | 8.56 | 14.24 |
| 13 | 4 | CH₂CH₂CH₂CH₂CH₂ | o-OCH₃ | 243-247/0.18 | 90 | 238.5-241 | Ethanol | C₂₄H₃₅N₃O₃·2HCl | 60.07 | 7.29 | 9.17 | 15.50 |
| 14 | 4 | (CH₂)₄ | o-Cl | 240-260/0.2 | 95 | 199.5-203 | do | C₂₃H₃₂ClN₃O₂·HCl | 64.90 | 8.32 | 9.79 | 7.64 |
| 15 | 4 | (CH₂)₃ | o-OCH₃ | 230-270/0.1 | 86 | 202-203.5 | do | C₂₅H₃₇N₃O₃·HCl | 66.71 | 8.10 | 9.84 | 8.26 |
| 16 | 4 | (CH₂)₄ | o-CH₃ | 255/0.01 | 90 | 246-247.5 | Isopropyl alcohol | C₂₃H₃₃N₃O₂·HCl | 65.57 | 8.36 | 10.00 | |
| 17 | 4 | (CH₂)₃ | o-OCH₃ | 230-250/0.3 | 88 | 254.5-255.5 (dec.) | Ethanol-ether | C₂₄H₃₇N₃O₃·HCl | 64.51 | 8.31 | 9.33 | 8.09 |
| 18 | 4 | (CH₂)₆ | o-OCH₃ | Not recorded | 75 | 174.5-176.5 | Isopropyl alcohol | C₂₄H₃₇N₃O₃·HCl | 60.21 | 7.87 | 9.14 | |
| 19 | 4 | (CH₂)₃ | p-CH₃ | 160-180/0.1 | 73 | 247-248 (dec.) | do | C₂₂H₃₁N₃O₂·HCl | 60.11 | 7.65 | 9.25 | |
| 20 | 4 | (CH₂)₂ | p-CH₃ | 165-200/0.05-0.1 | 80 | 236.5-238.5 (dec.) | do | C₂₁H₂₉N₃O₂·HCl | 59.15 | 7.07 | 9.62 | |
| 21 | 4 | (CH₂)₄ | o-Cl | 165-184/0.1 | 68 | 241-242.5 (dec.) | do | C₂₁H₂₈ClN₃O₂·HCl | 60.0 | 7.15 | 9.70 | 8.39 |
| 22 | 4 | (CH₂)₂ | m-Cl | 104-170/0.1 | 74 | 248.5-250.5 (dec.) | do | C₂₂H₃₀ClN₃O₂·HCl | 60.0 | 6.98 | 9.64 | |
| 23 | 4 | (CH₂)₂ | p-Cl | 140-210/0.05-0.1 | 74 | 226.5-228.5 (dec.) | Ethanol | C₂₂H₃₀ClN₃O₂·HCl | 59.26 | 7.03 | 9.32 | 16.33 |
| 24 | 4 | (CH₂)₃ | p-Cl | 175-197/0.1 | 90 | 248-249 (dec.) | do | C₂₂H₃₀ClN₃O₂·HCl | 60.30 | 6.98 | 9.32 | 8.33 |
| 25 | 4 | CH(CH₃)CH₂ | H | 230-240/0.25 | 87 | 255.5-257.5 | do | C₂₁H₃₁N₃O₂·2HCl | 59.67 | 7.55 | 9.47 | 15.54 |

Procedures 2 through 13 which follow exemplify the preparation of the aminoalkylpiperazine starting materials useful in Method A. Other specific compounds required have been previously described by S. Hayao et al. (loc. cit.).

Procedure 2. 1-(2-cyanoethyl)-4-(o-methoxyphenyl)piperazine.—A round bottom flask is equipped with a stirrer and reflux condenser fitted with a soda-lime drying tube. 1-(o-methoxyphenyl)piperazine, 19.2 g. (0.1 mole); 3-chloropropionitrile, 9.0 g. (0.1 mole); 150 ml. of dried benzene; and 16.6 g. (0.2 mole) of anhydrous sodium carbonate are placed in the flask and the mixture is refluxed with stirring overnight. On completion of the reflux period the reaction mixture is filtered to remove insoluble material comprising principally inorganic salts, and the filter cake is washed with hot benzene. The combined benzene filtrates are concentrated by distillation of the solvent, yielding the desired product which is purified by vacuum distillation, boiling point 208-226° C./1.0 mm. Hg. The distilled product crystallizes on standing as 19.6 g. (80%) of white crystalline solid, M.P. 72-74° C.

Procedure 3. 1-(3-aminopropyl)-4-(o-methoxyphenyl)piperazine.—A mixture of 8.1 g. (0.033 mole) of 1-(2-cyanoethyl)-4-(o-methoxyphenyl)piperazine, 30 g. of dry liquid ammonia, and 100 ml. of absolute methanol is hydrogenated at 1200 p.s.i. and room temperature employing W–6 Raney nickel catalyst. On completion of hydrogenation the mixture is filtered through an asbestos pad. The filtrate is concentrated by distillation of the solvent and the residue distilled as reduced pressure, yielding the desired product in 85% yield, B.P. 140–155° C./0.15 mm. Hg.

*Analysis.*—Calcd. for $C_{14}H_{23}N_3O$: C, 67.43; H, 9.30; N, 16.85. Found: C, 67.30; H, 9.23; N, 16.30.

The product of Procedure 3 serves as starting material for the product of Example 8 (Table I). Table II summarizes information relative to the preparation according to the method of Procedures 2 and 3 of various other starting materials of this type which are useful for preparation of a number of the foregoing products of Examples 1–25.

Procedure 15. 8-(2 - chloroethyl)-8-azaspiro[4,5]decane-7,9-dione.—8-(2 - hydroxyethyl)-8-azaspiro[4,5]decane-7,9-dione, 6.0 g. (0.028 mole), about 50 ml. of dry benzene, and 2.4 g. (0.03 mole) of dry pyridine are mixed in a flask equipped with a reflux condenser, addition funnel, thermometer, and stirrer. The mixture is cooled to 10° C. and 3.6 g. (0.03 mole) of thionyl chloride is added dropwise during 25 mins., while maintaining a maximum reaction temperature of 15° C. On completion of the thionyl chloride addition, the reaction mixture is heated for 1 hr. at 60–65° C. By-product pyridine hydrochloride is removed by filtration, and the filtrate mixed with 20 ml. of distilled water. The benzene layer is separated, dried, and the solvent removed by distillation. The product is a brown liquid which is distilled in vacuo yielding 4.5 g. (69%) of colorless to blue liquid product, B.P. 120–122° C./0.05 mm. Hg, $n_D^{25}$, 1.5139.

TABLE II.—1-(ω-AMINOALKYL)-4-PHENYLPIPERAZINE $$H_2N-A-N\diagup\diagdown N-\diagup\diagdown R^3$$

| Procedure | A | R³ | Yield | Boiling Point, ° C./mm. Hg | $n_D^{25}$ |
|---|---|---|---|---|---|
| 4 | (CH₂)₂ | m-CH₃ | 85.5 | 117–134/0.3 | 1.5638 |
| 5 | (CH₂)₃ | m-OCH₃ | 68.8 | 115–165/0.15 | 1.5561 |
| 6 | (CH₂)₃ | m-CH₃ | 48.0 | 120/0.18 | 1.5656 |
| 7 | (CH₂)₃ | m-Cl | 79.0 | 142–170/0.15–0.5 | |
| 8 | (CH₂)₃ | m-Cl | 62.0 | 108–140/0.1–0.15 | 1.5827 |
| 9* | CH₂CH₂CH(CH₃)CH₂ | H | 81.7 | 138–155/0.17 | 1.5485 |
| 10* | (CH₂)₄ | o-OCH₃ | 79.6 | 150–160/0.25 | 1.5496 |
| 11* | (CH₂)₄ | o-Cl | 74.0 | 130–165/0.15–0.35 | 1.5560 |
| 12* | (CH₂)₄ | o-CH₃ | 32.8 | 145–160/0.08 | |
| 13* | (CH₂)₅ | o-OCH₃ | 57.6 | 163–172/0.2 | 1.5444 |

*These substances were prepared by lithium aluminum hydride reduction rather than by catalytic reduction as described in Procedure 3. Procedure 9 is written in full below to illustrate this method.

Procedure 9. 1-(4-amino - 2 - methylbutyl)-4-phenylpiperazine.—1 - (3 - cyano-2-methylpropyl)-4-phenylpiperazine is prepared by condensation of 3-chloro-2-methylbutyronitrile-1-phenylpiperazine according to Procedure 2. A 65.3% yield of 1-(3-cyano-2-methylpropyl)-4-phenylpiperazine is obtained, exhibiting boiling point 155–168/0.15 mm., M.P. 81–83° C. This material, 0.04 mole, dissolved in 100 ml. of tetrahydrofuran is added dropwise with vigorous stirring to a suspension of 1.87 g. (0.05 mole) of lithium aluminum hydride in 100 ml. of ether during a period of 35 mins. The mixture is heated at reflux for 6 hrs., and then carefully treated with a solution of 3.65 ml. (0.15 mole) of water in 100 ml. of tetrahydrofuran. Insoluble material is removed by filtration and the filter cake is washed with two 500 ml. portions of hot tetrahydrofuran and one 500 ml. portion of hot absolute ethanol. The filtrates and washings are combined and the solvent is removed therefrom by distillation. The residue is distilled in vacuo to afford an 81.7% yield of the desired product, boiling point 138–155/0.17 mm. Hg, $n_D^{25}$, 1.5485.

METHOD B

Procedure 14. 8-(2 - hydroxyethyl) - 8 - azaspiro[4,5]decane-7,9-dione.—3,3-tetramethyleneglutaric anhydride, 16.8 g. (0.01 mole), and 200 ml. of pyridine, which serves as reaction medium, is placed in a round-bottomed flask equipped with a stirrer and reflux condenser which is in turn fitted with a calcium chloride drying tube. Stirring is commenced and 12.2 g. (0.2 mole) of ethanolamine is added to the mixture. Heating at reflux with stirring is then commenced and continued for 3 hrs. At the conclusion of the reflux period the pyridine and excess ethanolamine are removed by distillation at reduced pressure. The product is a yellow oil which is distilled in vacuo; yield, 12.0 g. (57%); B.P. 142–150° C./0.05–0.1 mm. Hg; $n_D^{25}$, 1.5150.

*Analysis.*—Calcd. for $C_{11}H_{15}ClNO_2$: C, 57.51; H, 7.02; Cl, 15.44; N, 6.10. Found: C, 57.21; H, 6.80; Cl, 15.41; N, 5.95.

Procedure 16. 8-[2-(1-o-methoxyphenyl-4-piperazinyl)ethyl]-8-azaspiro[4,5]decane-7,9 - dione.—A mixture of 23 g. (0.1 mole) of 8-(2-chloroethyl)-8-azaspiro[4,5]decane-7,9-dione, 19.2 g. (0.1 mole) of 1-(o-methoxyphenyl)piperazine, and 31.8 g. (0.3 mole) of anhydrous sodium carbonate in 400 ml. of dry benzene is refluxed with stirring for 15 hrs. The inorganic salts are removed by filtration, and the filtrate is concentrated to an oily residue by distillation of the solvent. The residue is distilled at reduced pressure giving the product which is identical with that described in Example 7 of Table I.

The application of Procedures 14 and 15 to the preparation of additional 8-(ω-chloroalkyl)-8-azaspiro[4,5]decane-7,9-diones is summarized in Table III. These intermediates are transformed in accordance with Method B into end products of the present invention using the reaction conditions of Procedure 16. The latter are summarized in Table IV.

TABLE III.—8-(ω-X-ALKYL)-8-AZASPIRO[4,5]DECANE-7,9-DIONES

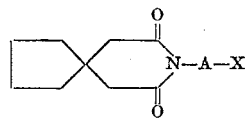

| Proc. No. | —A— | X | B.P. (° C./mm. Hg) | Yield (percent) |
|---|---|---|---|---|
| 17 | (CH₂)₃ | OH | 155–170/0.1–0.15 | 62 |
| 18 | (CH₂)₃ | Cl | 155–162/0.06 | 73 |
| 19 | CH₂CH₂OCH₂CH₂ | OH | 191–204/0.08–0.18 | 80.7 |
| 20 | CH₂CH₂OCH₂CH₂ | Cl | 155–165/0.25 | 50 |
| 21 | (CH₂)₄ | OH | 185–240/0.2 | 74.9 |
| 22 | (CH₂)₄ | Cl | 160–195/0.3 | 53.5 |

TABLE IV.—PRODUCTS PREPARED BY METHOD B

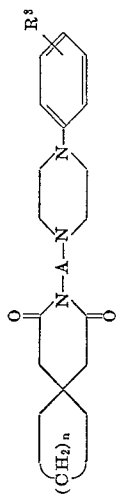

| Example No. | Formula | | | Base | | Hydrochloride | | | Analysis | | | | |
|---|---|---|---|---|---|---|---|---|---|---|---|---|---|
| | n | A | R³ | B.P., °C./mm. Hg | Percent yield | M.P., °C. | Solvent | Formula | C | H | N | Cl | S |
| 26 | 4 | (CH₂)₃ | p-OCH₃ | 220-245/0.1 | 65 | 225.5-226.5 (dec.) | | C₂₃H₃₃N₃O₃·HCl | 63.12 | 7.95 | 9.66 | 7.92 | |
| 27 | 4 | CH₂CH₂OCH₂CH₂ | o-OCH₃ | 240-260/0.2 | 20 | 206.5-208.5 | | C₂₂H₃₃N₃O₄·2HCl | 57.28 | 7.39 | 8.26 | 13.85 | |
| 28 | 4 | CH₂CH₂OCH₂CH₂ | H | 190-260/0.25-0.35 | 86 | 155-157 | | C₂₃H₃₃N₃O₂·HCl | 63.15 | 7.68 | 8.19 | 8.39 | |
| 29 | 4 | (CH₂)₃ | m-CH₃ | 160-185/0.05-0.1 | 92 | 240.5-242.5 (dec.) | | C₂₃H₃₃N₃O₂·HCl | 65.55 | 7.81 | 9.50 | 8.39 | |
| 30 | 4 | (CH₂)₃ | H | 240-260/0.2 | 69 | 217.5-218.5 | | C₂₂H₃₃N₃O₂·HCl | 65.55 | 7.92 | 9.70 | 8.45 | |
| 31 ³ | 4 | (CH₂)₄ | o-F | (¹) | | 188-190 | Ethanol-ether | C₂₃H₃₂N₃O₂F·HCl | 63.09 | 7.65 | 10.28 | 8.12 | |
| 32 | 4 | (CH₂)₄ | o-CH₃SO₂NH | (²) | 73.5 | 263.5-264.5 | Ethanol-methanol-ether | C₂₄H₃₆N₄O₄F·HCl | 56.17 | 7.31 | 9.67 | 6.60 | 6.23 |
| 33 | 4 | (CH₂)₄ | o-NO₂ | 160-180/0.1 | 26.8 | | | | | | 10.99 | | |

¹ Converted to hydrochloride salt without distillation.
² Purified by chromatography from benzene on 8 x 5 cm. silica column; elution with benzene containing 5% ethanol.
³ 2-methyl-1-phenylpiperazine was used as starting material; the resulting product is 8-[3-(3-methyl-4-phenyl-1-piperazinlyl)propyl]-8-azaspiro[4,5]decane-7,9-dione hydrochloride.

Procedure 23. 1-(o-methanesulfonamidophenyl)piperazine.—(a) A mixture of 31.5 g. of o-nitrochlorobenzene, 47.4 g. of 1-carbethoxypiperazine, and 16 ml. of pyridine in 200 ml. of n-butanol is prepared by the careful addition of the o-nitrochlorobenzene dissolved in a portion of the butanol to the remaining ingredients. The mixture is then refluxed overnight and concentrated under reduced pressure to remove the solvent and other volatile materials. The desired intermediate, 1-carbethoxy-4-(o-nitrophenyl)piperazine, is then separated by distillation of the crude residue, boiling point 185–210° C./0.08 mm. Hg, weight, 34.5 g.

(b) The product of the preceding paragraph is dissolved in about 300 ml. of 95% ethanol and hydrogenated at room temperature and 3–6 atmospheres pressure employing 200 mg. of 10% palladium-on-carbon catalyst. The calculated quantity of hydrogen is consumed in 35 min. The catalyst is removed by filtration and the filtrate concentrated in vacuo yielding a brown oil which crystallizes on standing. It is recrystallized from cyclohexane, yielding 26.2 g. of 4-(o-aminophenyl)-1-carbethoxypiperazine, M.P. 106–108° C.

(c) A portion of the product of the preceding paragraph weighing 8.3 g. is dissolved in about 50 ml. of pyridine and treated with 3.8 g. of methanesulfonyl chloride in dropwise fashion. An exothermic reaction occurs, and the mixture is stirred for 1 hr. on a steam bath. The solvent is then removed by distillation in vacuo and the residue recrystallized from absolute ethanol to yield 1-carbethoxy-4-(o-methanesulfonamidophenyl)piperazine.

(d) A portion of the product of the preceding paragraph weighing 6.54 g. is hydrolyzed by refluxing with 10 g. of sodium hydroxide dissolved in 100 ml. of methanol for about 4 hrs. The solvent is then removed by distillation in vacuo yielding 1-(o-methanesulfonamidophenyl)piperazine as a thin oil, which is used directly in the preparation of the product of Example 32 without further purification.

EXAMPLES 34–56

Application of method B to additional 8-[4-(1-substituted phenyl - 4 - piperazinyl)butyl] - 8 - azaspiro[4,5] decane-7,9-diones 8 - (4 - chlorobutyl) - 8 - azaspiro[4,5] - decane - 7,9-dione (Procedure 22), is allowed to react under the conditions of Procedure 16 with the 1-(substituted phenyl) piperazines listed in Table V. n-Butanol is used as reaction solvent. The products of the formula shown are then separated and purified according to conventional laboratory techniques. In Table V, the R-substituents defining the structures of the end product to complete the formula shown are identified adjacent to the substituted phenyl-piperazine starting materials.

TABLE V.—EXAMPLES 34-56

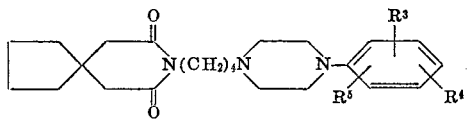

| Ex. No. | Starting Material | $R^3$ | $R^4$ | $R^5$ |
|---|---|---|---|---|
| 34 | 1-(3-chloro-2,4-xylyl)piperazine | 2-$CH_3$ | 3-Cl | 4-$CH_3$ |
| 35 | 1-(2,3-dichlorophenyl)piperazine | 2-Cl | 3-Cl | H |
| 36 | 1-(2,5-diethoxyphenyl)piperazine | 2-$C_2H_5O$ | H | 5-$C_2H_5O$ |
| 37 | 1-(o-ethoxyphenyl)piperazine | 2-$C_2H_5O$ | H | H |
| 38 | 1-(o-ethylphenyl)piperazine | 2-$C_2H_5$ | H | H |
| 39 | 1-(o-methylthiophenyl)piperazine | 2-$CH_3S$ | H | H |
| 40 | 1-(m-methylthiophenyl)piperazine | 3-$CH_3S$ | H | H |
| 41 | 1-(m-trifluoromethylphenyl)piperazine | 3-$CF_3$ | H | H |
| 42 | 1-(p-nitrophenyl)piperazine | H | 4-$NO_2$ | H |
| 43 | 1-(o-bromophenyl)piperazine | 2-Br | H | H |
| 44 | 1-(3-bromo-p-tolyl)piperazine | 3-Br | 4-$CH_3$ | H |
| 45 | 1-(3-bromo-2,4-xylyl)piperazine | 2-$CH_3$ | 3-Br | 4-$CH_3$ |
| 46 | 1-(o-butoxyphenyl)piperazine | 2-n-$C_4H_9O$ | H | H |
| 47 | 1-(5-chloro-2-ethylthiophenyl)piperazine | 2-$C_2H_5S$ | H | 5-Cl |
| 48 | 1-(5-chloro-2-methoxyphenyl)piperazine | 2-$CH_3O$ | H | 5-Cl |
| 49 | 1-(5-chloro-2-nitro-p-tolyl)piperazine | 2-$NO_2$ | 4-$CH_3$ | 5-Cl |
| 50 | 1-(3-chloro-o-tolyl)piperazine | 2-$CH_3$ | 3-Cl | H |
| 51 | 1-(o-propoxyphenyl)piperazine | 2-n-$C_3H_7O$ | H | H |
| 52 | 1-(o-propylthiophenyl)piperazine | 2-n-$C_3H_7S$ | H | H |
| 53 | 1-(2,5-xylyl)piperazine | 2-$CH_3$ | H | 5-$CH_3$ |
| 54 | 1-(3,5-xylyl)piperazine | 3-$CH_3$ | H | 5-$CH_3$ |
| 55 | 1-(3,4,5-trimethoxyphenyl)piperazine | 3-$CH_3O$ | 4-$CH_3O$ | 5-$CH_3O$ |
| 56 | 3-methyl-1-phenylpiperazine* | H | H | H |

*Resulting product is 8-[4-(1-phenyl-3-methyl-4-piperazinyl)butyl]-8-azaspiro[4,5]-decane-7,9-dione.

EXAMPLE 57

8-[4-(4-phenyl-1-piperazinyl)-2-butynyl]-8-azaspiro[4,5]decane-7,9-dione dihydrochloride (a) A mixture of 15.28 g. (0.0908 mole) of 3,3-tetramethyleneglutaric anhydride, 200 ml. of anhydrous pyridine, and 5.0 g. (0.09077 mole) of propargylamine were refluxed with stirring overnight in a flask protected from the atmosphere with a calcium chloride drying tube. The solvent pyridine was removed by distillation and the residue was distilled at reduced pressure, B.P. 129–145° C./0.15 mm. Hg. The nuclear magnetic resonance spectrum of this material indicated that it was not pure intermediate 8-propargyl-8-azaspiro[4,5]decane-7,9-dione, but rather this material contaminated with some of the anhydride starting material. It was nevertheless transformed according to the following procedure, without further purification.

(b) A mixture of 6.0 g. (0.03 mole) of the foregoing intermediate, 2.4 g. of 37% aqueous formaldehyde (0.0296 mole), a few crystals of cuprous chloride to serve as catalyst, 1.78 g. (0.0296 mole) of acetic acid, 2.9 g. of distilled water, and 4.8 g. (0.0296 mole) of 1-phenylpiperazine are heated on a water bath at 40° C. for 7 hrs. The reaction mixture is maintained in an atmosphere of dry nitrogen gas during this period. The resulting mixture is then extracted with three 75 ml. portions of chloroform, the extracts dried over magnesium sulfate, and the solvent removed under reduced pressure. The residue is dissolved in 90 ml. of anhydrous ethanol and treated with 15 ml. of saturated ethanolic hydrogen chloride. The crystalline hydrochloride salt separates as a precipitate, yield, 6.5 g. This material is twice recrystallized from ethanol, M.P. 173–174° C.

Analysis.—Calcd. for $C_{23}H_{29}N_3O_2 \cdot 2HCl$: C, 61.06; H, 6.91; N, 9.29. Found: C, 60.97; H, 6.79; N, 9.42.

EXAMPLE 58

8-[4-(4-o-methoxyphenyl-1-piperazinyl)-2-butynyl]-8-azaspiro[4,5]decane-7,9-dione dihydrochloride This material is prepared by the procedure of Example 57 by substituting 1-(o-methoxyphenyl)piperazine in Example 57(b). The product is separated and purified as the dihydrochloride salt, M.P. 172–175° C.

Analysis.—Calcd. for $C_{24}H_{31}N_3O_3 \cdot 2HCl$: C, 59.75; H, 6.89; N, 8.71; Cl, 14.60. Found: C, 59.49; H, 6.84; N, 8.52; Cl, 14.55.

EXAMPLE 59

8-[4-(1-o-aminophenyl-4-piperazinyl)butyl]-8-azaspiro[4,5]decane-7,9-dione

This product is prepared by hydrogenation of the product of Example 33 at room temperature and 3–6 atmospheres of pressure over a 10% palladium-on-carbon catalyst by the method of Procedure 23(b).

EXAMPLE 60

8-[4-(1-o-hexanesulfonamidophenyl-4-piperazinyl)butyl]-8-azaspiro[4,5]decane-7,9-dione The product of Example 58 is acylated with hexanesulfonyl chloride according to the method of Procedure 23(c).

EXAMPLE 61

8-[4-(1-o-hexanoamidophenyl-4-piperazinyl)butyl]-8-azaspiro[4,5]decane-7,9-dione The product of Example 58 is acylated with hexanoyl chloride in pyridine according to the method of Procedure 23(c).

EXAMPLE 62

8-[4-(1-o-acetamidophenyl-4-piperazinyl)butyl]-8-azaspiro[4,5]decane-7,9-dione

The product of Example 58 is acylated by reaction with acetyl chloride in pyridine according to the method of Procedure 23(c).

ANIMAL TESTS

The shuttle box technique described by J. R. Albert in The Pharmacologist 4, 152 (1962) and by L. E. Allen and J. R. Albert in The Pharmacologist 4, 152 (1962) is a test designed to differentiate tranquilizing drugs from nonspecific sedative hypnotic drugs. The apparatus employed is a box having a 6 in. barrier dividing the floor thereof into two equal portions. The floor of the left side of the box contains an electrified grid floor. The other side, or safe side, is not electrified. A group of rats is trained by placing them individually into the electrified portion of the box and administering a foot shock which causes the rat to jump the barrier to the safe side of the box. Trained rats without fail will jump the barrier on being placed into the left side of the box within 30 sec. without foot shock.

Each animal of the group of trained animals is then administered a dose of test drug intraperitoneally, and that dose of drug is determined by interpolation from a dose response curve which reduces the aggregate number of conditioned avoidance responses for the group by 50%. In other words, a group of 5 trained animals without drug treatment will exhibit 50 correct conditioned avoidance responses (CAR) by jumping over the barrier prior to foot shock when placed in the left side of the box for 10 repeated trials during a one-half hour period. When treated with an $ED_{50}$ dose of a tranquilizing drug, the number of correct responses for the same group is reduced to 25.

When a treated animal fails to jump the barrier within 30 sec. after being placed in the left side of the box, the foot shock is administered. If the animal then jumps the barrier, it is concluded that the drug treatment prevented only the conditioned avoidance response. Those animals which fail to jump the barrier after a 30 sec. shock are said to have their unconditioned escape response (UER) blocked. In other words, the drug treatment has so debilitated the animal as to make him incapable of jumping the barrier to escape the foot shock.

That dose of test compound which results in failure of the unconditioned escape response in 50% of the animals is referred to as the $ED_{50}$ value for unconditioned escape response. The ratio of these two values, that is the $UER-ED_{50}$ to the $CAR-ED_{50}$ value is indicative of the so-called tranquilizer selectivity of the drug's action. For transquilizer drugs a value in excess of 1 is obtained. The greater the value the more selective the drug with respect to transquilizer action as differentiated from sedative or hypnotic action.

Chlorpromazine hydrochloride has a $CAR-ED_{50}$ value of 5.2 mg./kg., a $UER-ED_{50}$ value of 30.2 mg./kg., both by intraperitoneal administration, giving a ratio of 5.8. The values obtained for a number of compounds of this invention are given in Table VI.

TABLE VI.—CONDITIONED AVOIDANCE RESPONSE

| Test Drug | $UER-ED_{50}$ (mg./kg.) | $CAR-ED_{50}$ (mg./kg.) | Ratio |
| --- | --- | --- | --- |
| Chlorpromazine hydrochloride | 30.2 | 5.2 | 5.8 |
| Meprobamate | 150 | 153 | 1.0 |
| Example 1 | >103 | 25.6 | >4.0 |
| Example 2 | 73.1 | 38.6 | 1.9 |
| Example 3 | >50 | 8.6 | >5.9 |
| Example 4 | 29.1 | 20.6 | 1.4 |
| Example 6 | >117 | 38.7 | >3.0 |
| Example 7 | >100 | 24.6 | >4.0 |
| Example 8 | 38.2 | 12.5 | 3.1 |
| Example 9 | >157 | 39.3 | >4.0 |
| Example 10 | >140 | 35 | >4.0 |
| Example 11 | >50 | 41 | >1.2 |
| Example 26 | 42.3 | 26.6 | 1.6 |
| Example 13 | 2.8 | 2.4 | 1.2 |
| Example 27 | 27 | 18 | 1.5 |
| Example 28 | 43 | 3.9 | 1.1 |
| Example 14 | 25 | 11 | 2.3 |
| Example 15 | 8.6 | 5.4 | 1.6 |
| Example 16 | 28 | 16 | 1.7 |

The antagonism of amphetamine aggregation stress is another test used to evaluate tranquilizer drugs. It is designed to detect drugs that will antagonize the increased toxicity of amphetamine observed when housing a number of animals treated with it in a single cage as opposed to measuring amphetamine toxicity in animals housed individually. A phenomenon of increased toxicity is observed with DL-amphetamine sulfate when measured under the grouped condition. Tranquilizer drugs have the capacity of alleviating the increased toxic effect of amphetamine on the grouped animals.

According to this test, groups of 10 male mice weighing 18-28 g. are administered various dose levels of the test compound subcutaneously. The mice are segregated into individual cages for 60 min. and then injected subcutaneously with 20 mg./kg. of DL-amphetamine sulfate (the $LD_{99.9}$ dose) and aggregated into groups of 10 mice per cage. The number of deaths is recorded after 24 hrs. The percent surviving at each dose is plotted and the $ED_{50}$ value to produce 50% survival is calculated. For the tranquilizer drug chlorpromazine hydrochloride, an $ED_{50}$ of 0.38 is recorded.

The results obtained with compounds of this invention are shown in Table VII.

TABLE VII.—ANTAGONISM OF AMPHETAMINE AGGREGATION STRESS

| Test drug: | $ED_{50}$ (mg./kg.) |
| --- | --- |
| Chlorpromazine hydrochloride | 0.38 |
| Meprobamate | Not active at 250 |
| Example 1 | 31.8 |
| Example 2 | 2.44 |
| Example 3 | 3.3 |
| Example 4 | 9.1 |
| Example 5 | 4.5 |
| Example 6 | 11.5 |
| Example 7 | 9.5 |
| Example 8 | 5.1 |
| Example 17 | 5.8 |
| Example 29 | 10.6 |
| Example 12 | 5.9 |
| Example 13 | 0.4 |
| Example 27 | 6.0 |
| Example 14 | 1.2 |
| Example 18 | 0.9 |
| Example 15 | 0.4 |

Compounds of Formula I are highly active agents in preventing the phenylquinone writhing syndrome in mice. The method of Hendershot and Forsaith, J. Pharmacol. Exp. Therap. 125, 237 (1959) is used to measure this effect. Groups of 10 to 20 mice are injected subcutaneously with graduated doses of the test compound. At the time of peak effect, as previously determined, the animals are administered a dose of 2.5 mg./kg. of phenylquinone intraperitoneally. The latter injection produces writhing episodes in mice. The number of such episodes exhibited by each mouse during the 10 min. period following injection is counted and the average percent decrease in the number of episodes as compared to a control group of mice is recorded for each dose of test compound. A log dose-response curve is prepared and the dose of test compound required to decrease the number of writhing episodes by 50% is estimated by interpolation. The results for several compounds of the present invention are listed in Table VIII.

TABLE VII.—PREVENTION OF PHENYLQUINONE WRITHING

| Test drug: | $ED_{50}$ (mg./kg.) |
| --- | --- |
| Aspirin | 20.0 |
| Codeine sulfate | 3.0 |
| Example 7 (free base form) | 28.5 |
| Example 2 | 9.8 |
| Example 3 | 2.4 |
| Example 8 | 2.8 |
| Example 12 | 32.0 |
| Example 13 | 0.6 |
| Example 16 | 0.8 |

Another of the pharmacologic effects exhibited by compounds of Formula I is the ability to inhibit formation of the local edema which forms on plantar injection of formalin into the foot of a rat according to a standard screening test for anti-inflammatory agents (C. A. Winter "International Symposium on Non-Steroidal Anti-inflammatory Drugs," International Congress Series No. 82, Excerpta Medica Foundation, 1965, pp. 190–202).

The test is performed on adult rats of either sex using a group of five animals as non-medicated controls and another group of five which is treated subcutaneously with the test compound 15 min. prior to induction of edema. Edema is induced by the plantar injection of formalin, 0.1 ml. of a 4% solution, into the right hind foot. The left hind foot is treated similarly with 0.1 ml. of 0.9% saline. One hour later the volume of each hind foot is determined plethysmographically by measuring the volume of mercury displaced. The amount of edema is expressed as the percent increase in volume of the formalin-injected foot over the saline-injected foot. The percent inhibition of edema is calculated by dividing the mean percent increase in the edema of the formalin feet of the medicated group by the mean increase in the non-medicated group multiplied by 100. Various doses of test compound are evaluated and the $ED_{50}$ value is determined by interpolation from a dose response curve. The $ED_{50}$ value is determined by interpolation from a dose response curve. The $ED_{50}$ is that dose which reduces the edema by 50%.

Other agents may also be employed in this test to induce the edema. The present compounds have been found to be active in inhibiting the edema produced by injection of 0.1 ml. of a solution containing 10 mcg. of serotonin or 0.1 ml. of a 0.5% solution of carageenin. Table IX contains the $ED_{50}$ doses determined for a number of compounds of the present invention against formalin edema.

TABLE IX.—INHIBITION OF FORMALIN EDEMA

| Test drug: | $ED_{50}$ (mg./kg.) |
| --- | --- |
| Methdilazine | 64 |
| Example 19 | 28 |
| Example 10 | 5 |
| Example 58 | 12.5 |
| Example 13 | 8 |
| Example 27 | 18 |
| Example 28 | 18 |
| Example 14 | 1.4 |
| Example 18 | 5.2 |
| Example 15 | 0.9 |
| Example 16 | 3.5 |

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:
1. A compound selected from the group consisting of a compound having the formula

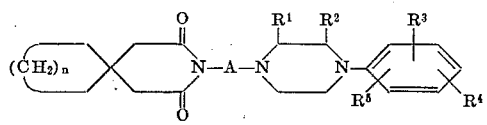

wherein $R^1$ and $R^2$ are hydrogen or methyl, $R^3$, $R^4$, and $R^5$ are hydrogen, alkyl of up to 4 carbon atoms, lower alkoxy of up to 4 carbon atoms, lower alkylthio of up to 4 carbon atoms, halogen, trifluoromethyl, nitro, amino, alkanoamido or alkylsulfonamido of up to 6 carbon atoms, A is a divalent group linking the nitrogen atoms as shown through at least 2 carbon atoms and is selected from alkylene of 2 to 6 carbon atoms, oxalkylene of 4 to 6 carbon atoms wherein neither nitrogen-connecting carbon atom is linked to the oxygen atom thereof, and 2-butynylene, neither nitrogen-connecting carbon atoms is linked to the oxygen atom therefo, and 2-butynylene, $n$ is the integer 4 or 5 and the pharmaceutically acceptable acid addition salts thereof.

2. The compound of claim 1 wherein A is ethylene, $R^1$, $R^2$, $R^4$, and $R^5$ are hydrogen, $R^3$ is o-methoxy, $n$ is the integer 4 and which is identified by the chemical name 8 - [2 - (4 - o - methoxyphenylpiperazinyl)ethyl] - 8 - azaspiro[4,5]decane-7,9-dione.

3. Hydrochloric acid addition salt of the compound of claim 2.

4. The compound of claim 1 wherein A is tetramethylene, $R^1$, $R^2$, $R^3$, $R^4$, and $R^5$ are hydrogen, $n$ is the integer 4, and which is identified by the chemical name 8-[4-(4-phenyl-1-piperazinyl)butyl]-8 - azaspiro[4,5]decane - 7,9-dione.

5. Hydrochloric acid addition salt of the compound of claim 4.

6. The compound of claim 1 wherein A is trimethylene, $R^1$, $R^2$, $R^4$, and $R^5$ are hydrogen, $R^3$ is o-chloro, $n$ is the integer 4, and which is identified by the chemical name 8 - [3 - ( 4 - o - chlorophenyl - 1 - piperazinyl)propyl]-8-azaspiro[4,5]decane-7,9-dione.

7. Hydrochloric acid addition salt of the compound of claim 6.

8. The compound of claim 1 wherein A is tetramethylene $R^1$, $R^2$, $R^4$, and $R^5$ are hydrogen, $R^3$ is o-chloro, $n$ is the integer 4, and which is identified by the chemical name 8-[4-(4-o-chlorophenyl-1-piperazinyl)butyl]-8-azaspiro[4,5]decane-7,9-dione.

9. Hydrochloric acid addition salt of the compound of claim 8.

10. The compound of claim 1 wherein A is tetramethylene $R^1$, $R^2$, $R^4$, and $R^5$ are hydrogen, $R^3$ is o-methyl, $n$ is the integer 4, and which is identified by the chemical name 8-[4-(4-o-tolyl-1-piperazinyl)butyl] - 8 - azaspiro[4,5]decane-7,9-dione.

11. Hydrochloric acid addition salt of the compound of claim 10.

References Cited

UNITED STATES PATENTS 3,030,366  4/1962  Biel _____ 260—268

HENRY R. JILES, *Primary Examiner.*

UNITED STATES PATENT OFFICE
CERTIFICATE OF CORRECTION

Patent No. 3,398,151                                    August 20, 1968

Yao Hua Wu

It is certified that error appears in the above identified patent and that said Letters Patent are hereby corrected as shown below:

Column 1, line 18, "pentamethyleneglutonic" should read -- pentamethyleneglutaric --. Column 2, lines 25 to 29, the integer "2", in the lower left-hand corner of the formula, should read -- 3 --. Column 3, lines 25 to 31, the right-hand portion of formula V should appear as shown below:

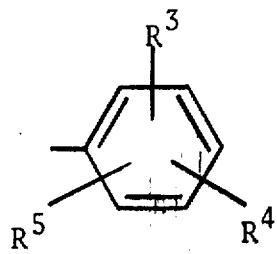

Column 4, line 21, "azasiprodecane" should read -- azaspirodecane --; line 31, "(X≡OH)" should read -- (X=OH) --. Column 9, TABLE IV, under the heading "Percent Yield", line 1 thereof, "20" should read -- 80 --; same TABLE IV, footnote 3 thereof, "piperazinly" should read -- piperazinyl --; same footnote, "8-azasipro" should read -- 8-azaspiro --. Column 14, line 44, "TABLE VII" should read -- TABLE VIII --. Column 16, lines 9 and 10, cancel "neither nitrogen-connecting carbon atoms is linked to the oxygen atom therefo, and 2-butynylene,".

Signed and sealed this 10th day of February 1970.

(SEAL)
Attest:

EDWARD M. FLETCHER, JR.                        WILLIAM E. SCHUYLER, JR.
Attesting Officer                                        Commissioner of Patents